Patented Apr. 21, 1925.

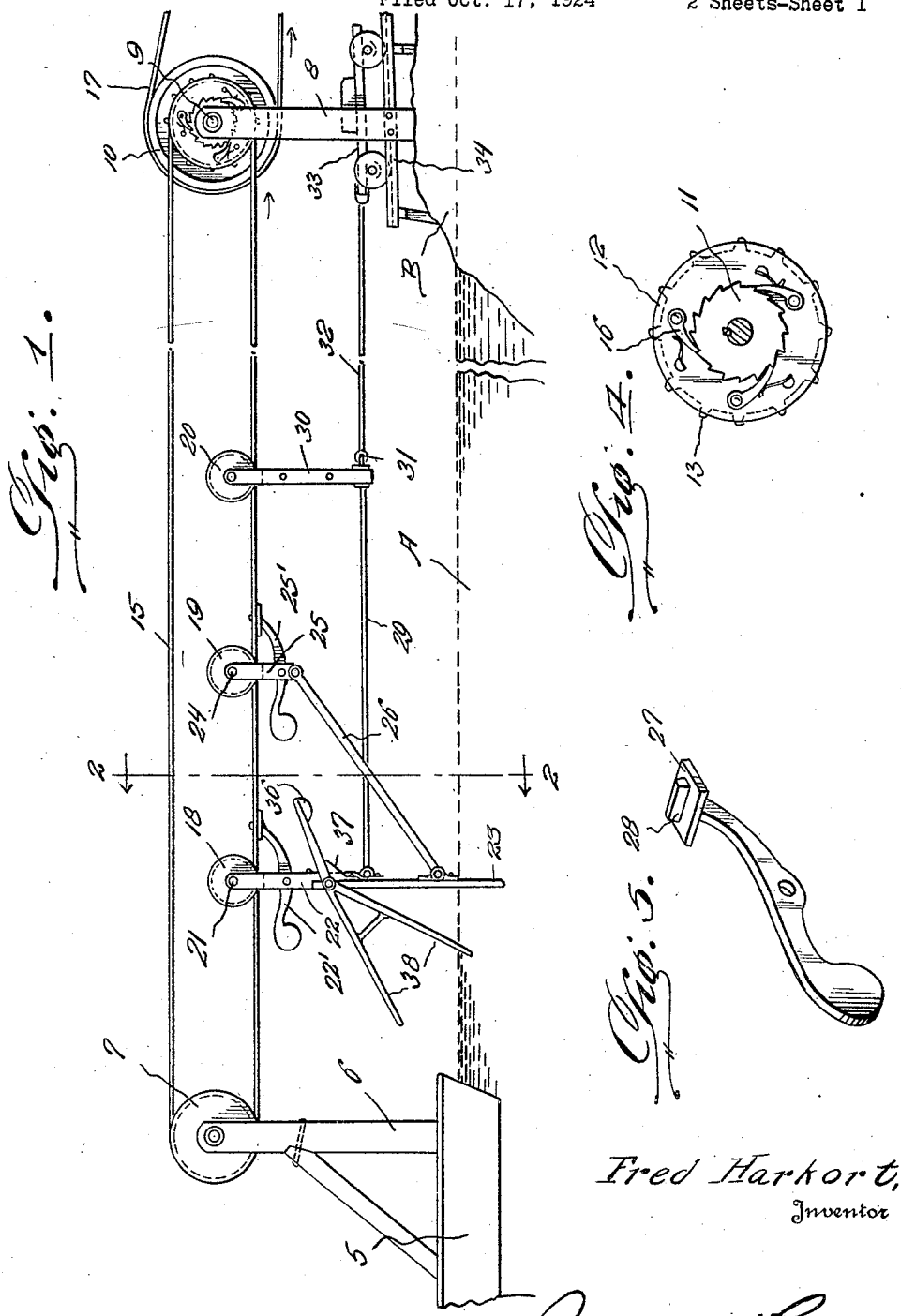

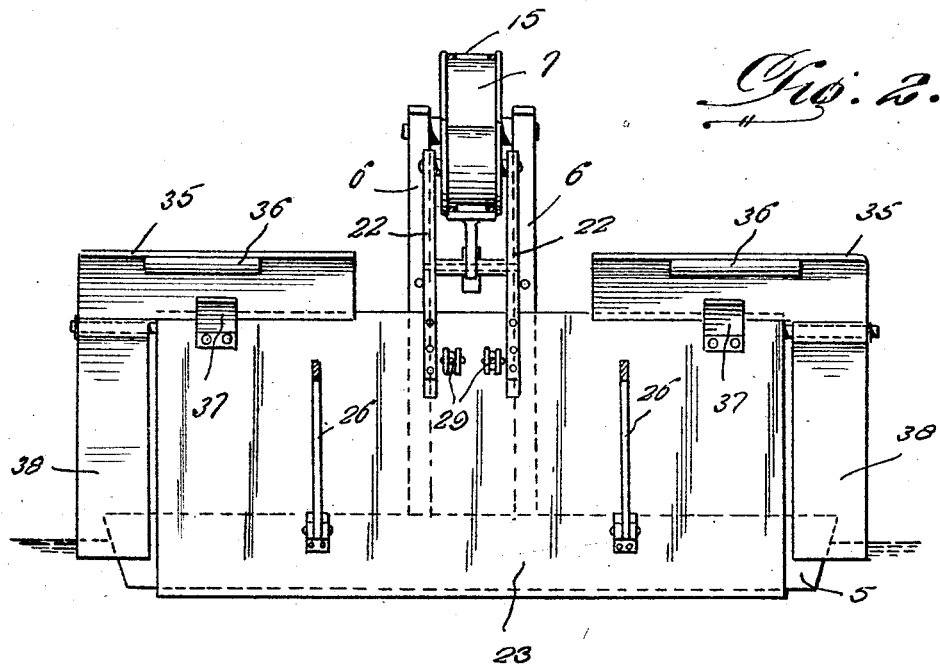
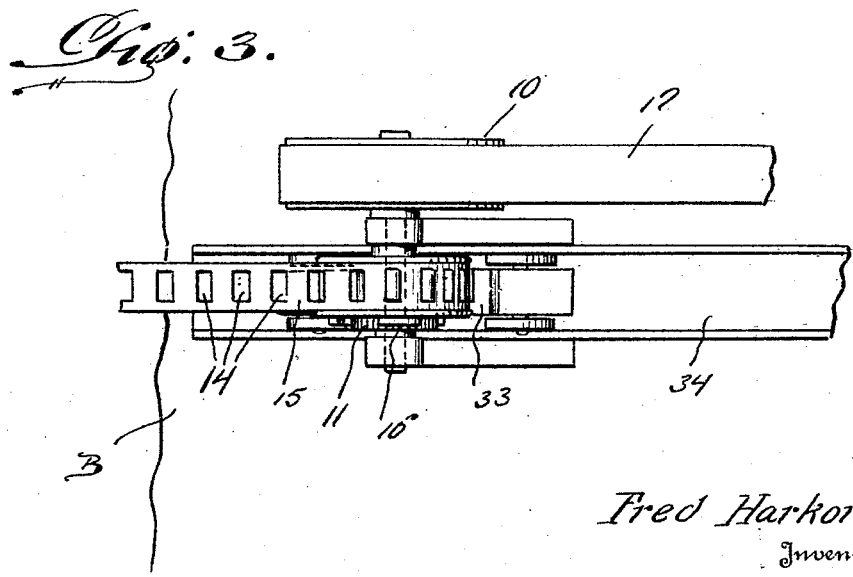

1,534,115

UNITED STATES PATENT OFFICE.

FRED HARKORT, OF MONTEREY, CALIFORNIA.

WAVE MOTOR.

Application filed October 17, 1924. Serial No. 744,210.

*To all whom it may concern:*

Be it known that I, FRED HARKORT, a citizen of the United States, residing at Monterey, in the county of Monterey and State of California, have invented certain new and useful Improvements in a Wave Motor, of which the following is a specification.

This invention relates to power devices and has more particular reference to an apparatus that is adapted to be disposed at the shore line of a body of water whereby power is developed by the action of waves or breakers at the shore line.

The primary object of my invention resides in the provision of a device of the above mentioned character, wherein the force of the wind and waves is employed in the development of power.

A further and important object is to provide a power device that is of comparatively simple construction and one that may be installed and operated at a minimum expenditure and one that requires little or no attention on the part of an operator.

An additional object is to provide a power device of this nature that includes a wave engaging element operatively connected to a machinery driving device to be moved in one direction by the force of the waves and then to be automatically moved in a reverse direction after the wave recedes in an entirely automatic manner.

A still further object is to provide a wave motor that may be readily employed in the operation of electric current generating plants or other machinery.

With the foregoing and other objects in view as the nature of the invention will be better understood the same comprises the novel form, combination and arrangement of parts hereinafter more fully described, shown in the accompanying drawings and claimed.

In the drawings wherein like reference characters indicate corresponding parts throughout the different views:

Figure 1 is a side elevation view of the power device constructed in accordance with the present invention.

Figure 2 is a detail vertical sectional view taken substantially upon the line 2—2 of Figure 1 looking in a direction toward the left as shown by the arrows in said Figure 1.

Figure 3 is a fragmentary top plan view of the apparatus.

Figure 4 is an enlarged sectional view through the drive shaft of the present apparatus, for disclosing more clearly in side elevation a pulley and ratchet mechanism associated therewith, and Figure 5 is a perspective of one of the locking dogs between the wave and wind operating construction and a drive belt that also includes an essential part of the present invention.

Now having particular reference to the drawings, A designates a body of water, and B the bank or shore of said body of water. My invention constitutes the provision of a barge or scow 5 that is suitably anchored to the floor of the water body at a point remote from said shore line B. The end of this barge or scow adjacent said shore line is provided with suitable vertical standards 6 within and between the upper ends of which is mounted a loose pulley wheel 7. Upon the bank B in substantial alignment with the standard 6 is an additional pair of vertical standards 8 between the upper ends of which is journaled a shaft 9 to which is keyed a belt pulley 10 of slightly greater dimension than said pulley 7. Keyed to said shaft 9 is a ratchet wheel 11 and between said ratchet wheel and pulley there is loosely associated with said shaft a belt pulley 12 of dimensions similar to the dimensions of the first mentioned belt pulley 7. In this instance however said pulley 12 is formed at its periphery with spaced sprocket teeth 13 that engage within spaced openings 14 in a power belt 15 that is trained over the pulleys 7 and 12 in the manner as clearly shown in Figure 1.

The face of the pulley 12 adjacent the sprocket wheel 11 is provided with a plurality of pivoted spring pressed dogs 16 whereby when the pulley is moved in the direction of the arrow in Figure 1 through the action of the belt 15 a rotation of the shaft 9 will occur which rotation of the shaft will consequently operate the pulley 10 from which is led a power belt 17 whereby any form of machinery may be driven.

Disposed upon the lower flight portion of the belt 15 are three or more spaced pulleys 18, 19 and 20 respectively. Pendant from the opposite ends of a pintle 21 that extends through the pulley 18 are legs 22—22 that are rigidly secured at their lower ends to a relatively wide and horizontally disposed wave engaging blade 23.

Depending from the opposite ends of a pintle 24 extending through the middle pulley 19 are relatively short legs 25 from the lower end of which extend connecting links 26 that are secured at their opposite ends to the rear face of said blade 23 for maintaining said blade in a substantially horizontal position and for preventing any buckling of the lower belt flight when the blade is engaged by the waves.

Between the legs 22 of the pulley 18 and the legs 25 of the pulley 19 are pivoted and weighted locking dogs 22′ and 25′ respectively. Each of these dogs is formed upon its unweighted end with a plate 27 that is in turn formed upon its top side with a lug 28 that is adapted for engagement within one of the openings 14 of the belt 15 for manifestly providing a locking means between the belt and said legs whereby the impact of the waves onto the blade 23 will cause the same to move rearwardly and thereby operate the belt 15 in the direction of the arrow in Figure 1 which operation will be imparted to the drive pulley 10. Extending toward the shore line B is a rod 29 that is anchored at its forward end to the rear side of the blade 23 and at its opposite end to legs or bars 30 depending from the rearmost pulley 20. Pivotally secured to this end of said rod 29 as at 31 is a further rod 32 that is pivotally connected to a weighted carriage 33 that moves upon an inclined runway 34 disposed upon the shore line or bank B of the body of water A. During the rearward movement of the blade 23 by the action of the waves thereon said carriage 33 will be moved rearwardly upon the runway and as the wave recedes the carriage will roll down the runway for manifestly moving the blade into its initial position.

In order that the wind pressure at the shore line may be employed in assisting in the operation of the device I provide a pair of vanes 35 that are suitably pivoted adjacent the opposite edges of the blade 23 and at the upper edge thereof. These vanes are weighted at 36 for normally maintaining the same in the rearwardly inclined position shown in Figure 1. The rearward swinging movement of the vanes being limited by stops 37 at the upper edge of the blade 23. The outer end of each vane 35 is formed with a pair of pendant and outwardly converging legs 38 that will be engaged by the waves coming in toward the shore line at which time the vanes 35 will be moved in a substantially vertical position to be encountered by the wind pressure for assisting as above set forth in the rearward movement of the belt operating construction.

Although I have shown and described but a single apparatus it is nevertheless to be understood that a plurality of these apparatus may be employed and interconnected as a unit for obviously producing a continuous rotation of the power shaft.

Minor changes may be made in the invention without departing from the spirit of the invention and the scope of the appended claims.

Having thus described the invention, what I claim is:—

1. In a wave motor of the character described, an endless belt trained over spaced pulleys anchored above the shore line and water surface respectively, a wave engaging blade operatively connected to the belt and adapted to actuate the same when engaged by the waves, means upon the shore for automatically returning the blade and belt to initial position, and means whereby machinery may be operated by the actuation of said belt.

2. In a wave motor of the character described, an endless belt trained over spaced pulleys anchored above the shore line and water surface respectively, a wave engaging blade operatively connected to the belt and adapted to actuate the same when engaged by the waves, means upon the shore for automatically returning the blade and belt to initial position, means whereby machinery may be operated by the actuation of said belt, and means associated with the blade whereby the air force may be utilized in the actuation of said blade.

3. In a wave motor of the character described, an endless belt trained over spaced pulleys anchored above the shore line and water surfaces respectively, a wave engaging blade operatively connected to the belt and adapted to actuate the same when engaged by the waves, means upon the shore for automatically returning the blade and belt to initial position, means whereby machinery may be operated by the actuation of said belt, means associated with the blade whereby the air force may be utilized in the actuation of said blade, said means including air vanes at the opposite ends of said blade.

In testimony whereof I affix my signature.

FRED HARKORT.